United States Patent
Schoen et al.

(10) Patent No.: US 10,110,413 B2
(45) Date of Patent: Oct. 23, 2018

(54) COMMUNICATING INFORMATION IN A SOCIAL NETWORK SYSTEM ABOUT ACTIVITIES FROM ANOTHER DOMAIN

(75) Inventors: Kent Matthew Schoen, San Francisco, CA (US); Gregory Luc Dingle, Palo Alto, CA (US); Timothy Kendall, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 448 days.

(21) Appl. No.: 13/023,197

(22) Filed: Feb. 8, 2011

(65) Prior Publication Data

US 2011/0231240 A1 Sep. 22, 2011

Related U.S. Application Data

(60) Provisional application No. 61/302,494, filed on Feb. 8, 2010.

(51) Int. Cl.
*G06Q 30/00* (2012.01)
*H04L 29/08* (2006.01)
(Continued)

(52) U.S. Cl.
CPC ... *H04L 29/08675* (2013.01); *G06Q 30/0242* (2013.01); *G06Q 30/0251* (2013.01);
(Continued)

(58) Field of Classification Search
None
See application file for complete search history.

(56) References Cited

U.S. PATENT DOCUMENTS 6,839,680 B1 * 1/2005 Liu et al. ............... 705/7.33
2006/0143068 A1 * 6/2006 Calabria ................ 705/10
(Continued)

FOREIGN PATENT DOCUMENTS

JP 2007-328538 12/2007
JP 2009-245000 10/2009
(Continued)

OTHER PUBLICATIONS

Search Report for WO 2011/097624, dated Oct. 18, 2011.
(Continued)

*Primary Examiner* — Michael W Schmucker
(74) *Attorney, Agent, or Firm* — Baker Botts L.L.P.

(57) ABSTRACT

In one embodiment, a method is described for tracking information about the activities of users of a social networking system while on another domain by maintaining a profile for each user of the social networking system, each profile identifying a connection to other users of the social networking system and including information about the user, receiving communications from a third party website having a different domain than the social network system, each message communicating an action taken by a user of the social networking system on the third party website, logging the actions taken on the third-party website in the social networking system, each logged action including information about the action, and correlating the logged actions with one or more advertisements presented to the one or more users on the third-party website as well as correlating the logged actions with a user of the social networking system.

20 Claims, 9 Drawing Sheets

(51) Int. Cl.
*G06Q 30/02* (2012.01)
*H04L 12/58* (2006.01)

(52) U.S. Cl.
CPC .............. *H04L 51/32* (2013.01); *H04L 67/22* (2013.01); *H04L 51/34* (2013.01)

(56) References Cited

U.S. PATENT DOCUMENTS

| | | | |
|---|---|---|---|
| 2008/0228537 A1* | 9/2008 | Monfried et al. | 705/7 |
| 2009/0119167 A1* | 5/2009 | Kendall et al. | 705/14 |
| 2009/0144146 A1* | 6/2009 | Levine et al. | 705/14 |
| 2009/0248494 A1 | 10/2009 | Hueter | |
| 2010/0223119 A1* | 9/2010 | Klish | 705/14.26 |

FOREIGN PATENT DOCUMENTS

| | | |
|---|---|---|
| KR | 10-2009-0060084 | 6/2009 |
| WO | 2009/026395 A1 | 2/2009 |
| WO | 2009/029940 A1 | 3/2009 |
| WO | 2009/061616 A1 | 5/2009 |
| WO | 2009/061617 A1 | 5/2009 |

OTHER PUBLICATIONS

Australia Patent Examination Report for Application No. 2011/213606, dated Jun. 18, 2013.
Office Action of State Intellectual Property Office of the People's Republic of China for Application No. 201180017998.0, dated Oct. 29, 2014.
Japanese Office Action for Patent Application 2012-552151, dated Nov. 11, 2014.
Japanese Office Action for Patent Application No. 2012-552151 (with translation), dated Aug. 4, 2015.
Extended European Search Report for Application No. 11740527.4, dated Sep. 24, 2015.
Adrienne Felt, et al., "*Privacy Protection for Social Networking Platforms,*" Workshop on Web 2.0 Security and Privacy, Oakland, CA, May 22, 2008.
Second Office Action of the State Intellectual Property Office of the People's Republic of China for Application No. 201180017998.0 (with translation), dated Feb. 28, 2015.
Canadian Office Action received from the Canadian Intellectual Property Office for Canadian Patent Application No. 2,789,224, dated Dec. 20, 2016.
Communication Pursuant to Article 94(3) EPC received from the European Patent Office (EPO) for EP Application No. 11 740 527.4-1870, dated Apr. 15, 2016.

* cited by examiner

Member did Action (to Target) (on Object) (Content)
         705    710      715        720          725

COMMUNICATING INFORMATION IN A SOCIAL NETWORK SYSTEM ABOUT ACTIVITIES FROM ANOTHER DOMAIN

CROSS REFERENCE TO RELATED APPLICATIONS

The present application claims priority to U.S. Provisional Application Ser. No. 61/302,494 filed Feb. 8, 2010, which is incorporated by reference herein for all purposes.

TECHNICAL FIELD

The present disclosure relates generally to social network systems and other websites in which users can form connections with other users, and in particular, to tracking activities of users of social network systems on other domains to, for example, analyze, target, or gauge the effectiveness of advertisements (ads) rendered in conjunction with social network systems.

BACKGROUND

Social networks, or social utilities that track and enable connections between users (including people, businesses, and other entities), have become prevalent in recent years. In particular, social network systems allow users to communicate information more efficiently. For example, a user may post contact information, background information, job information, hobbies, and/or other user-specific data to a location associated with the user on a social network system. Other users can then review the posted data by browsing user profiles or searching for profiles including specific data. The social network systems also allow users to associate themselves with other users, thus creating a web of connections among the users of the social network system. These connections among the users can be exploited by the website to offer more relevant information to each user in view of the users' own stated interests in their connections.

Social network systems typically incorporate a system for connecting users to content that is most likely to be relevant to each user. For example, users may be grouped according to one or more common attributes in their profiles, such as geographic location, employer, job type, age, music preferences, interests, or other attributes. Users of the social network system or external parties can then use these groups to customize or target information delivery so that information that might be of particular interest to a group can be communicated to that group. Advertisers have attempted to leverage this information about users, targeting their ads to users whose interests best align with the ads.

Figure 1:
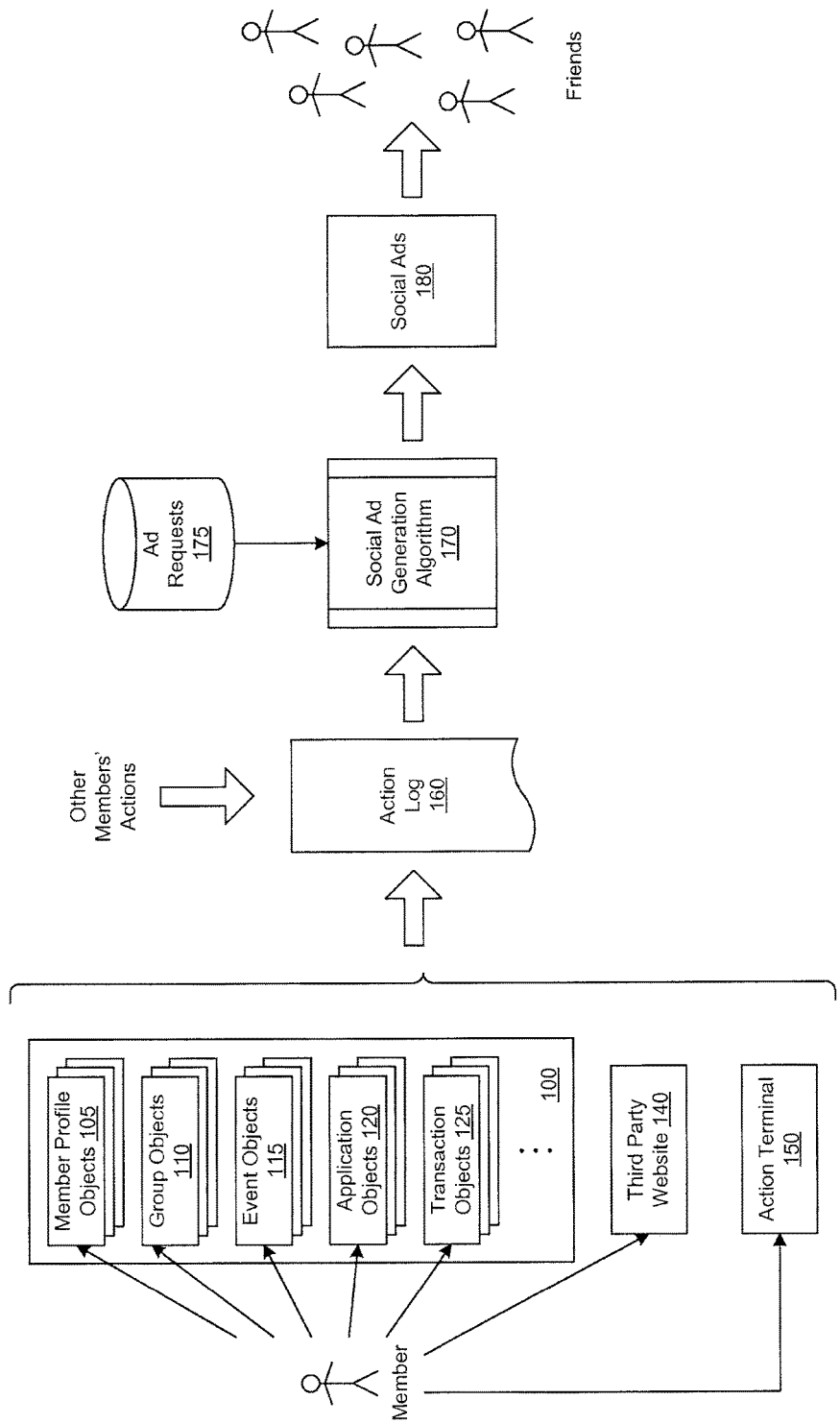
FIG. 1 is an event diagram illustrating the collection of user actions and the creation of ads for the user's friends on the website, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Advertising Related to User Actions on a Website

Particular embodiments relate to a social networking environment including a social networking system capable of presenting advertising to users (users of the social network system or system) that is more effective than traditional targeted online advertising by using the information it obtains about its user's actions, and particularly actions taken with respect to third-party websites, as well as, in some embodiments, their connections to other users of the social network system. Rather than simply deliver an advertisement that is targeted to a particular user based on the user's preferences as, for example, declared by the user in the user's profile page, particular embodiments present advertisements that communicate information about, or take into account, actions taken by the user as well as potentially other users in the user's network (i.e., the user's friends and other relationships and connections in the social network system). Furthermore, the actions taken by users can be correlated to the vast array of information attributes that the social network system maintains in order to improve analytical and targeting processes as well as the user experience with the social networking environment.

By way of example, the social network system of various example embodiments, may select advertisements to be displayed in various sections of various pages hosted by the social networking system such as, for example, home pages, profile pages, application pages, among other. In some implementations, the social network system utilizes an ad network having an ad inventory in which it keeps ads for one or more ad campaigns for one or more third-parties. In particular implementations, when a client application (e.g., a web browser) at a client device consumes a structured document (e.g., an HTML document) used to render a page hosted at least in part by the social networking system, underlying scripts or calls when executed at the client device make and transmit (or cause to make and cause to transmit) requests for ads from third-party advertisers directly or to ad networks having ad inventories, which then may return an ad that is then displayed in conjunction with the currently rendered page in the form of, by way of example, a text-based ad, a banner ad, etc. In particular embodiment, the ads requested by the page being rendered may be targeted based on a number of attributes such as age, sex, demographic, location, income, career, as well as based on friendships or groups the associated user may have established or entered into. Particular embodiments contemplate any form of advertisement displayed in conjunction with social network system.

In particular embodiments, a social network system as described herein utilizes information about activities from another domain communicated to and within the social network system. The social network system maintains a profile for each of a plurality of users of the social network system, where each profile identifies a connection that the user has to other users of the website. These users may also take certain actions on different third-party websites that have a different domain than the social network system. In particular embodiments, these third-party websites tailor advertisement campaigns or utilize tailored advertisement campaigns that include advertisements to be rendered and displayed to users of the social network system. In particular embodiments, these third-party websites register conversion tracking tags with the social network system as will be described in more detail below.

In particular embodiments, the social network system receives messages from these third-party websites that communicate the actions taken by users while in the third-party websites. More particularly, in various example embodiments, when a user takes one or more certain actions on a third party website such as, for example, making a purchase on the third-party website, the third-party website may transmit a page (herein referred to as a "conversion page"), such as a "thank you" or "confirmation" page to the user's client device. Generally, a conversion page is a page hosted by a third-party website that is displayed to a user to confirm the completion of a desired action. In particular embodiments, the conversion page includes a conversion tracking tag which may be a code snippet or segment (e.g., one or more of JavaScript and HTML) that is configured to, when the conversion page is executed or rendered by the user's client device, to make a call or transmit a request or message to the social network system to inform the social network system of the particular action. In particular embodiments, an executable JavaScript code snippet may cause a tracking pixel to be generated in the conversion page. Alternately, an iFrame, <img> tag or other HTML code may be used to generate such a tracking pixel. The tracking pixel may then be communicated to the social network system as a result of executing the code snippet. In particular embodiments, the tracking pixel includes parameters such as, the user ID of the user (as it is registered with the social network system), an ID for the third-party website, a product or service ID, product or service information concerning the product or service purchased by the user on the third party website, as well as timestamp information indicating when the action was taken (e.g., product or service was purchased).

In particular embodiments, these parameters are logged by the social network system, analyzed, and can be correlated to logged advertisement history, especially logged advertisements previously displayed to the user (impressions) or clicked-on by the user (click-thrus), including those that may have been advertising the product or service the user purchased. In particular embodiments, social networking system may track a number of types of conversions in a conversion log, which may be a separate log devoted to tracking actions having corresponding advertisements. By way of example, in particular embodiments, social networking system tracks both post-impression and post-click conversions. Post-click conversions are from users who have clicked on an ad associated with the tracking tag. Post-impression conversions are from users who have seen, either on the third-party website or on a page of the social network system, but didn't necessarily click on an associated ad.

In particular embodiments, the advertising history logged by the social networking system, which may be analyzed and correlated for a particular user based on his or her user ID, may be further correlated with conversion tracking; that is, for example, using cookies set at the user's client device by the social networking system to determine which ads the user actually clicked on (click-thrus) as opposed to those which were displayed but not clicked on (impressions) by the user. In this way, using conversion tracking as well as action tracking based on information obtained from (directly or indirectly) third-party websites, the social networking system may correlate this data over a suitable time window and determine a likelihood of whether particular ads or ad campaigns, whether clicked-on or simply displayed to a particular user, ultimately motivated that user to actually purchase the advertised product or participate in an advertised activity from the third-party website. Such information may also be combined with information from the user's friends to develop recommendations or to tailor ads to be targeted to the user or the user's friends. In other words, the social network system performs conversion tracking and action logging (with the help of third-party websites) to populate a rich data pool that may then be used to quantitatively gauge the effectiveness of selected advertisements and advertising methods displayed to users of the social networking system, as well as to develop, provide recommendations for, or target particular ads to particular users.

The advertisements served to users of the social networking systems can be banner or text ads, the creative or content for which are created by the advertisers. In some embodiments, the social network system can generate advertisements and other messages based on the activities of the users on the other websites and/or gauge the effectiveness of previously shown advertisements. For a particular user, for example, the social network system may generate an informational message for the user, wherein the informational message communicates a logged action that is associated with another user of the website with whom the user has a connection. The informational message (e.g., a "social advertisement") is then provided on a web page (e.g., a home page, profile page, newsfeed, etc.) that the social network system serves to the user. In this way, the user can be informed of online activities that the user's friends have taken outside the social network system. Although the present disclosure contemplates the tracking of conversions and actions related to virtual any type of advertisement displayable in conjunction with the social network system, in some embodiments, a news feed may serve as a social ad, and thus, a news feed may be correlated with any of the described logs to determine the effective of the news feed or other "social ad" in making a conversion. By way of example, as used herein, a "social ad" may refer to an advertisement in the form of a news feed, a post on a user's profile, home, or other page, or simply in the form of a more traditional advertisement such as a banner ad, for example, that informs the user that a friend (or a number of friends) of the user has purchased a particular item from a third-party website, will attend an event sponsored by an advertiser, or has added a connection to a profile for a business or other entity. Social ads allow advertisers to leverage one user's actions to promote specific content to others who might be interested in that information—not only because they might have similar interests, but also because of their connection with the user. This mode of advertising may be more effective because users are more likely to be influenced to respond to an advertiser's message in the presence of information that their friends or other connections have also taken an action related to the advertiser. Social ads thus allow advertisers to enjoy the credibility that consumers naturally give to their friends through word of mouth advertising. Beyond simple targeting of ads that merely chase demand, therefore, this approach may be better able to create or generate demand by providing the socially related information to users about their friends' actions.

In particular embodiments, these actions taken by the user or other users in the user's network are actions on a third-party website other than the social network system. The actions taken on a different or third-party website upon which an ad may be based may include any action that an advertiser might want to use in an advertisement directed to someone's connections on the social network system.

In particular embodiments, the third-party website having a different domain than the social network system may facilitate this communication of information in the social network system. For example, the third-party website may detect certain actions taken by a user on that website, and then determine whether the user is a user of the social network system. If so, in particular embodiments, the third-party website communicates this information to a user's client computing device, which then may communicate a reporting message to the social network system to communicate the action taken by the user of the social network system at the third-party site. More particularly, as described above, the third-party website may embed an executable conversion tracking tag in the form of a code snippet or segment such as a JavaScript call, or, alternatively, an IFrame or HTML code segment, that, in some embodiments, generates or constructs a image tag or tracking pixel (e.g., a 1 by 1 pixel), and that includes parameters such as the user's ID, information about the third party website, information about the product looked at or purchased, as well as timestamp information, all of which may then be transmitted to the social network system.

In particular embodiments, third-party websites, including advertisers that advertise their or others products on pages hosted by the social networking system, generate conversion tracking tags specific to the respective advertiser. As used herein, a "conversion" may refer to an action, especially an action taken on or at a third-party website, but also potentially an action taken within the social network system (e.g., an action within the social network system that indicates interaction/engagement with an advertised product or service after advertisement exposure), in which a user of the social networking system converts a transaction, registration, download, or other suitable action or event; that is, purchases a product or registers for a service offered by the third-party website. An example of an "internal" conversion may be that a user posts about a product, becomes a fan of the product, emails a link to a friend with that product or the product's associated third-party website, installs an application or gives a gift related to the product or service, and shares this back to the social networking system.

In particular embodiments, the third-party website (e.g., advertiser) registers with the social networking system and generates, in conjunction with the social network system, a conversion tracking tag (e.g. a JavaScript code snippet or segment, an image tag or tracking pixel) that may include such parameters as, for example, a tag name, a type of conversion event the third-party wishes to track, and a conversion value (a third party-defined numerical value associated with a purchase, lead, or other conversion action), among other possibilities. The tag is then registered with the social network system and then also pasted, embedded, or otherwise included into the third-party website's conversion pages, such as confirmation pages, the third-party website transmits to users who have completed certain defined conversion actions or events.

In a particular implementation, the advertiser uses an <img> or other tag as an advertising pixel that points to an endpoint at the social networking system (e.g., facebook.com/impression.php). The URL generated for each pixel can be made unique by a tracking ID and a hash of the tracking ID. At creation time, the advertiser is prompted to set a category for the pixel, like "purchase" or "sign-up", to facilitate reporting on the pixels and aggregate across advertisers. As discussed above, the advertiser can optionally supply additional info that is meaningful to it: sku and value. These metrics can be used for grouping and summing respectively in advertiser-facing reports. To ensure that pixels are requested on every page load of the host page, the following HTTP headers can be set: cache-control: no-cache; expires: time( )-1.

Alternatively, advertisers may use JavaScript embedded into their conversion landing pages. The snippet may look like this:

```
<script language="JavaScript"
src="http://static.ak.facebook.com/connect.php/
AdConversionTracking"></script>
<script language="JavaScript" type="text/javascript">
<!--
var fb_conversion_tracking_params = {
'id' : 23498234,
'hash' : '324fe3234c',
'type' : 'Purchase'
'sku' : '334-E2-234',
'value' : 1
};
FB.trackConversion(fb_conversion_tracking_params);
//--></script>
```

The JS script tag can automatically pull in any additional information and generate an <img> tag to point to <img src="http://www.facebook.com/impression.php> and pass in desired parameters.

Conversion tracking tags may be placed by the third-party website in a number of suitable desired locations of the conversion page. By way of example, by placing the tracking tag before the closing <body> tag on a web page, this will ultimately inform the social network system that it is supposed to track visits to that page. As another example, to track individual purchases, downloads, and registrations, the conversion tracking tag can be placed into the conversion page on the third-party website that loads directly after the action to be tracked. In such an example, the tag may be placed in the HTML code right before the closing </body> text. In other embodiments, it may be desirable to track a series of page views leading to a conversion action. To do this, a tracking tag may be placed at all pages leading to a possible conversion. Then, the third-party website may simply specify different SKU values for each page, by way of example, with a tag with one SKU value on you homepage, another on the product page, one more in the shopping cart, and another to reflect actual purchases on the confirmation purchase page.

In one embodiment, the selection of advertisements displayed to a user or the user's friends is made so as to maximize the advertising revenue to the social network system, particularly in cases where the resources to publish the ads are limited, for example, in terms of the available area on a screen display for showing the ads. In one advertising model, each advertiser may bid a certain amount of money for each instance that a user clicks on or takes some other follow-on action with respect to the ad whether the action is on or off the social network system or on the third party website. To increase the advertising revenue, the social network system selects which ads to present to a particular user based on the expected revenue values for each of the qualified ads. The expected revenue value for an ad may be a function of a user's affinity for the content of the information in the ad (which acts as a proxy for the likelihood that a user will click on the ad) and the amount of money that the social network system will receive for that action. In some cases the expected revenue value may additionally be a function of the user's likelihood of clicking on an ad based on other ads the user has clicked on in the past.

A social network system offers its users the ability to communicate and interact with other users of the website. In use, users join the social network system and then add connections to a number of other users to whom they desire to be connected. As used herein, the term "friend" refers to any other user or entity to whom a user has formed a connection, association, or relationship and which is defined via the social network system. Connections may be added explicitly by a user, for example, the user selecting a particular other user to be a friend, or automatically created by the social networking site based on common characteristics of the users (e.g., users who are alumni of the same educational institution). Connections in social network systems are usually in both directions, but need not be, so the terms "user" and "friend" depend on the frame of reference. For example, if Bob and Joe are both users and connected to each other in the website, Bob and Joe, both users, are also each other's friends. The connection between users may be a direct connection; however, some embodiments of a social network system allow the connection to be indirect via one or more levels of connections. Also, the term friend need not require that users actually be friends in real life, (which would generally be the case when one of the users is a business or other entity); it simply implies a connection in the social network system.

In addition to interactions with other users, the social network system provides users with the ability to take actions on various types of items supported by the website. These items may include groups or networks (where "networks" here refer not to physical communication networks, but rather social networks of people) to which users of the website may belong, events or calendar entries in which a user might be interested, computer-based applications that a user may use via the website, and transactions that allow users to buy or sell items via the website. These are just a few examples of the items upon which a user may act on a social network system, and many others are possible.

As illustrated, the social network system 100 maintains a number of objects for the different kinds of items with which a user may interact on the website 100. In one example embodiment, these objects include user profiles 105, group objects 110, event objects 115, application objects 120, and transaction objects 125 (respectively, hereinafter, groups 110, events 115, applications 120, and transactions 125). In one embodiment, an object is stored by the website 100 for each instance of its associated item. For example, a user profile 105 is stored for each user who joins the website 100, a group 110 is stored for each group defined in the website 100, and so on. The types of objects and the data stored for each is described in more detail below in connection with FIG. 3, which illustrates an embodiment of the social network system 100.

The user of the website 100 may take specific actions on the website 100, where each action is associated with one or more objects. The types of actions that a user may perform in connection with an object is defined for each object and largely depends on the type of item represented by the object. A particular action may be associated with multiple objects. Described below are a number of examples of particular types of objects that may be defined for the social network system 100, as well as a number of actions that can be taken for each object. These objects and the actions discussed herein are provided for illustration purposes only, and it can be appreciated that an unlimited number of variations and features can be provided on a social network system 100.

The social network system 100 maintains a user profile 105 for each user of the website 100. Any action that a particular user takes with respect to another user is associated with each user's profile 105. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well.

A group 110 may be defined for a group or network of users. For example, a user may define a group to be a fan club for a particular band. The website 100 would maintain a group 110 for that fan club, which might include information about the band, media content (e.g., songs or music videos) by the band, and discussion boards on which users of the group can comment about the band. Accordingly, user actions that are possible with respect to a group 110 might include joining the group, viewing the content, listening to songs, watching videos, and posting a message on the discussion board.

Similarly, an event 115 may be defined for a particular event, such as a birthday party. A user may create the event 115 by defining information about the event such as the time and place and a list of invitees. Other users may accept the invitation, comment about the event, post their own content (e.g., pictures from the event), and perform any other actions enabled by the website 100 for the event 115. Accordingly, the creator of the event 115 as well as the invitees for the event may perform various actions that are associated with that event 115.

The social network system may also enable users to add applications to their profiles. These applications provide enhanced content and interactivity within the social network system 100, which maintains an application object 120 for each application hosted in the system. The applications may be provided by the website operator and/or by third party developers. An example application is an enhanced messaging service, in which users can send virtual objects (such as a "gift" or "flowers") and an optional message to another user. The use of any functionality offered by the application may thus constitute an action by the user in connection with the application 120. In addition, continuing the example from above, the receipt of the virtual gift or message may also be considered an action in connection with the application 120. It can therefore be appreciated that actions may be passive and need not require active participation by a user.

One particular type of object shown in the example of FIG. 1 is a transaction 125. A transaction object enables users to make transactions, such as buying, selling, renting, trading, or exchanging with other users or other third-party websites. For example, a user may post a classified ad on the social network system 100 to sell a car. The user would thus define a new transaction 125, which may include a description of the car, a picture, and an asking price. Other users can then view this information and possibly interact further with the transaction 125 by posting questions about the car and accepting the offer or making a counteroffer. Each of these interactions—view, question posting, offer, and counteroffer—are actions that are associated with the particular transaction 125.

When a user takes an action on the social network system 100 or third-party website, the action is recorded in an action log 160. In one embodiment, the website 100 maintains the action log 160 as a database of entries. When an action is taken on the website 100 or third-party website, therefore, the website 100 adds an entry for that action to the log 160. In one embodiment, an entry comprises some or all of the following information:

Time: a timestamp of when the action occurred.
User: an identifier (user ID) for the user who performed the action.
Target: an identifier for the user to whom the action was directed.
Action Type: an identifier for the type of action performed.
Object: an identifier for an object acted on by the action.
Content: content associated with the action.
Tag name
Conversion type identifier It can be appreciated that many types of actions that are possible in the website 100 need not require all of this information. For example, if a user changes a picture associated with the user's profile, the action may be logged with just the user's identifier, an action type defining a picture change, and the picture or a link thereto as the content.

As described above, in particular embodiments, the social network system 100 also logs actions that a user takes on a third party website 140. The social network system 100 may learn of the user's actions on the third party website 140 via any of a number of methods. In particular embodiment, in response to certain actions such as, a user registering with a third-party website 140, purchasing a product from a third-party website 140, downloading a service from a third-party website 140, or otherwise making a conversion, the third-party website 140 transmits a conversion page, such as a confirmation or "thank you" page to the user at the user's client device. In particular embodiment, this page includes an embedded call or code segment (e.g., JavaScript) in the HTML or other structured document code (e.g., in an HREF (Hypertext REFerence) that, in particular embodiments, generates a tracking pixel that, when executed by the client's browser or other rendering application, generates a tracking pixel or image tag that is then transmitted to the social network system (whether the user is logged into the social network system or not). The tracking pixel or image tag then communicates various information to the social network system about the user's action on the third-party website. By way of example, the tracking pixel or call may transmit parameters such as the user's ID (user ID as registered with the social network system), a product ID, information about the third-website, timestamp information about the timing of the purchase or other action, etc. In one example, if the third party website 140 is a commercial website on which users may purchase items, the third party website 140 may inform the social network system 100 in this manner when a user of the social network system 100 buys an item on the third party website 140.

In particular embodiments, third-party actions may be recorded by an action terminal 150, which observes qualifying actions and then communicates that action to the social network system 100 as, for example, indirectly by transmitting a tracking pixel or image tag to the client, which then communicates the information about the action to the social network system 100. The communication may be via email, SMS, or any other appropriate means, where the communicated message includes sufficient information for the social network system 100 to populate the action log 160 with an entry describing the action. The action terminal 150 may comprise any suitable devices or systems for the particular type of action to be tracked. In particular embodiments, the action to be tracked is a credit card transaction, where a user of the social network system 100 may optionally opt in by registering a credit card. When the registered credit card is used in a qualifying way (e.g., a purchase made at a point of sale), the credit card company (or clearinghouse) sends a message to the social network system 100 either directly or indirectly by means of transmitting a conversion tracking tag to and intermediary client device of the user. Again, in particular embodiments, the credit card company may transmit a tracking pixel with a confirmation page, and upon consumption of the page by the client's browser or other application, the tracking pixel calls or otherwise communicates this information to the social network system 100. In this scenario, a computing system at the credit card company or clearinghouse serves as a action terminal 150. The message may contain information about the credit card transaction, such the item purchased, the date, and location of the purchase. The social networking system thus tracks real-world actions such as this purchase in the action log 160.

Another example illustrating real-world actions that may be tracked involves the user's location. A user may configure a cellular phone having location technology (e.g., GPS) to communicate the user's location to the social network system 100. This may be accomplished, for example, by downloading an application to the cellular phone, where the application polls the location unit in the phone and sends a message containing the user's location to the social network system 100. This may be performed periodically or upon certain triggering events associated with locations. For example, a triggering event can include the user being within to a specific city, or at particular destination such as a restaurant, business, or venue. In this application, the cellular phone (or other GPS-enabled device) serves as the action terminal 150.

Another example illustrating real-world actions that may be tracked involves what program material the user is accessing on a television system. A television and/or set-top receiver may act as an action terminal 150 and transmit a message indicating that a user is viewing (or recording) a particular program on a particular channel at a particular time. Again, these examples are presented to illustrate some of the types of devices and actions that may be captured as actions by a user and communicated to the social network system 100. A limitless variety of other applications may be implemented to capture real-world actions associated with a particular user and send that information to the social network system 100.

After an amount of time, the action log 160 will become populated with a number of entries that describe actions taken by the users of the social network system 100. In particular embodiments, action log 106 includes both tracked actions taken by users at third-party websites as well as conversion tracking associated with advertisements seen or clicked-on by users. The action log 160 thus contains a very rich set of data about the actions of the users, and can be analyzed and filtered to identify trends and relationships in the actions of the users, as well as affinities between the users and various objects. In particular embodiments, the actions (e.g., purchases) made by a user at a third-party website may be correlated with the user's advertisement history and tracked conversions. In this way, social network system can determine if certain ads such as banner ads and the heredescribed social ads for example, whether clicked-on or not, likely contributed to the user or the user's friends actually purchasing the advertised product or service. Such quantifiable gauging of advertising effective may be useful in generating leverage with ad providers such as ad networks that generally run advertisement campaigns on behalf of third-party website, for example.

In particular embodiments, at some point in its operation, the social network system 100 may obtain an ad 180 to display on the website. As described herein, ads may be banner ads, text ads, video ads, audio ads, and any other form of advertising distributed over a network. The ads may be created by advertisers and submitted to the social network system 100 for distribution according to various CPM or CPC models as described above. The ads may also by social ads as described herein. FIG. 1 illustrates a process in which an aforedescribed social ad is generated for one of the friends of the user. To generate such a social ad 180 for one of the user's friends, the website 100 accesses the action log 160 and a database of ad requests 175. The database of ad requests 175 include a number of requests that define criteria for creating an ad 1800. Using the ad requests 175 and the action log 160, the website 100 applies a social ad generation algorithm 170 to create one or more social ads 180 tailored for the particular friend. Each generated ad 180 comprises an advertising message that communicates a message about at least one user action from the action log 160. In one embodiment, the ad 1800 communicates a message about the actions of some number of friends of the user. For example, a user may receive a message like "Three of your friends have joined the "Yale Alumni Network." The advertising message may also include additional content from the advertiser. The advertising message is communicated to the friend, for example as a message on the friend's home page, in an email message, in a list or newsfeed of other advertising messages and stories describing various actions taken, or any other electronic communication medium. The ad requests 175 and the ad generation algorithm 170 are described in more detail below.

In another embodiment, the action log can be divided into multiple action logs, each such action logs containing actions taken by a particular user. The actions could also be stored initially in these user specific action logs. To generate a social ad for a particular user, the website would access the action logs of the user's friends and a database of ad requests. Using the ad requests and one or more of the action logs, the website applies a social ad generation algorithm to create one or more social ads tailored for the particular user.

Website Architecture

Figure 2:
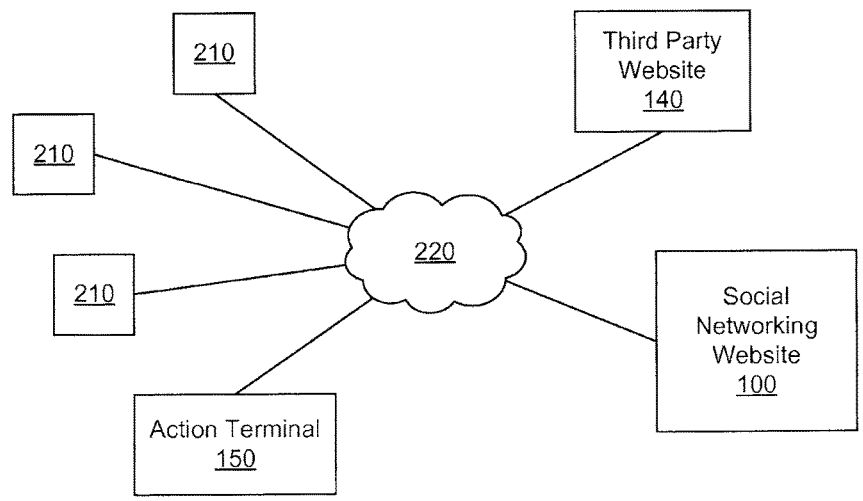
FIG. 2 is a network diagram of a system for providing ads to users of a social network system, in accordance with an embodiment of the invention.

FIG. 2 is a high level block diagram illustrating a system environment suitable for operation of a social network system 100. The system environment comprises one or more client devices 210 also referred to as user devices 210 or member devices 210), one or more third-party websites 140, a social network system 100, and a network 220. In alternative configurations, different and/or additional modules can be included in the system.

The client devices 210 comprise one or more computing devices that can receive user input and can transmit and receive data via the network 220. For example, the client devices 210 may be desktop computers, laptop computers, smart phones, personal digital assistants (PDAs), or any other device including computing functionality and data communication capabilities. The client devices 210 are configured to communicate via network 220, which may comprise any combination of local area and/or wide area networks, using both wired and wireless communication systems. As described above, the third party website 140 and the action terminal 150 are coupled to the network 220 for communicating messages to the social network system 100 about the users' actions off the website 100.

The social network system 100 comprises a computing system that allows users to communicate or otherwise interact with each other and access content as described herein. The social network system 100 stores user profiles that describe the users of a social network, including biographic, demographic, and other types of descriptive information, such as work experience, educational history, hobbies or preferences, location, and the like. The website 100 further stores data describing one or more relationships between different users. The relationship information may indicate users who have similar or common work experience, group memberships, hobbies, or educational history. Additionally, the social network host site 230 includes user-defined relationships between different users, allowing users to specify their relationships with other users. For example, these user defined relationships allows users to generate relationships with other users that parallel the users' real-life relationships, such as friends, co-workers, partners, and so forth. Users may select from predefined types of relationships, or define their own relationship types as needed.

Figure 3:
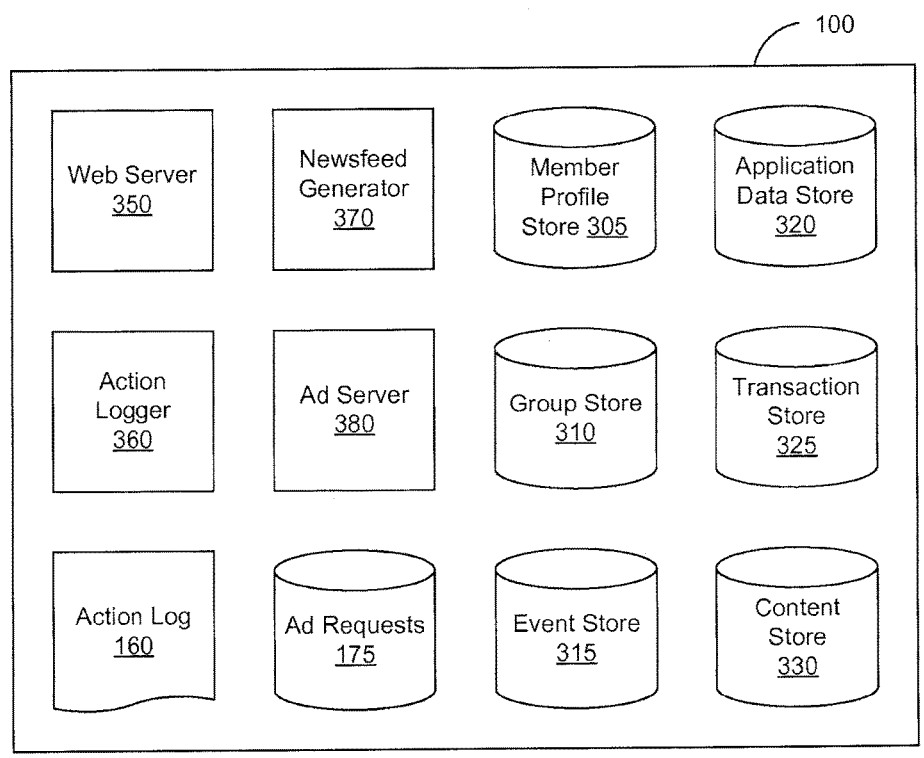
FIG. 3 is a block diagram of a social network system, in accordance with an embodiment of the invention.

FIG. 3 is an example block diagram of a social network system 100. The social network system 100 includes a web server 350, an action logger 360, an action log 160, a newsfeed generator 370, an ad server 380, a database of ad requests 175, a user profile store 305, a group store 310, an event store 315, an application data store 320, a transaction store 325, and a content store 330. In other embodiments, the social network system 100 may include additional, fewer, or different modules for various applications.

The web server 350 links the social network system 100 via the network 220 to one or more client devices 210, as well as to one or more third party websites 140. The web server 350 may include a mail server or other messaging functionality for receiving and routing messages between the social network system 100 and the client devices 210 or third party websites 140. The messages can be instant messages, queued messages (e.g., email), text and SMS messages, or any other suitable messaging technique.

The action logger 360 is capable of receiving communications from the web server 350 about user actions on and/or off the social network system 100. As described in more detail below in connection with FIG. 4, the action logger 360 populates the action log 160 with information about these user actions tracked in the log 160.

The newsfeed generator 370 generates communications for each user about information that may be relevant to the user. These communications may take the form of stories, each story is an information message comprising one or a few lines of information about an action in the action log that is relevant to the particular user. The stories are presented to a user via one or more pages of the social network system 100, for example in each user's home page, profile page, or newsfeed. The operation of the newsfeed generator 370 is described in more detail below in connection with FIGS. 4 and 6.

The ad server 380 performs the ad selection algorithm 170 discussion above. The operation of the ad server 380 is described in more detail below in connection with FIGS. 4 and 9. The ad server 380 is communicatively coupled to the database of ad requests 175 and to the action log 160 for this purpose.

As discussed above, the social network system 100 maintains data about a number of different types of objects with which a user may interact on the website 100. To this end, each of the user profile store 305, the group store 310, the event store 315, the application data store 320, and the transaction store 325 stores a data structure to manage the data for each instance of the corresponding type of object maintained by the website 100. The data structures comprise information fields that are suitable for the corresponding type of object. (For example, the event store 315 contains data structures that include the time and location for an event, whereas the user profile store 305 contains data structures with fields suitable for describing a user's profile.) When a new object of a particular type is created, the website 100 initializes a new data structure of the corresponding type, assigns a unique object identifier to it, and begins to add data to the object as needed. This might occur, for example, when a user defines a new event, wherein the website 100 would generate a new instance of an event in the event store 315, assign a unique identifier to the event, and begin to populate the fields of the event with information provided by the user.

Publishing Social Information, Stories, and Advertisements to Users

Figure 4:
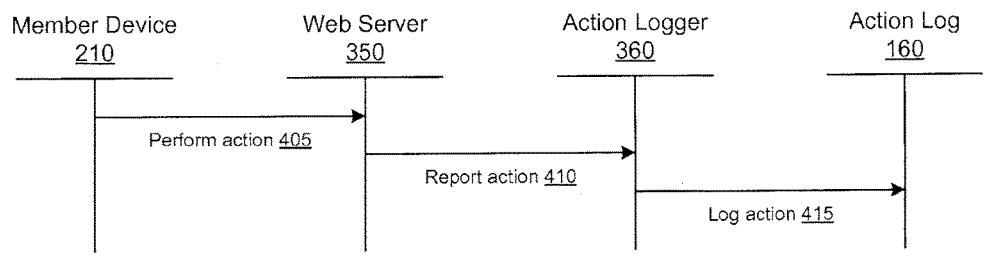
FIG. 4 is an interaction diagram of a process for logging user actions, in accordance with an embodiment of the invention.

FIG. 4 illustrates a process in which user actions are logged in the action log 160, in one embodiment. In this process, a user uses a user client device 210 to perform 405 an action in connection with the social network system 100. This action may be a user selection of a link on the website 100 using the user client device 210, and the selection of the link is thus received by the web server 350. As described above, however, the website 100 may receive messages from third party websites 140 and/or from action terminals 150 about user actions performed off the social network system 100. Upon notification of the user's action, the web server 350 reports 410 the action to the action logger 360, which logs 415 the action in the action log as described above. As described above, the messages sent from third-party websites 140 to social network system 100 may be sent indirectly; that is, first a conversion page including a tracking pixel, or the means to generate one, is transmitted to the user's client computing device. Second, the tracking pixel or other executable code segment transmits the tracking pixel to the social network system 100 or makes a call to the social network system 100 that includes various parameters as described above. Here it should be noted that particular embodiments enable the tracking of users via their respective user IDs, which are constant for each user (e.g., don't change based on what device the user is using), regardless of what user devices the user's may be using to access the social network system or third-party website.

This process for obtaining log entries in the action log 10 of various user actions repeats each time a user of the social network system 100 performs an action. In this way, the action log 10, over time, may store a rich information set about the actions of the website's users, which can then be leveraged for marketing purposes. The website 100 may ignore certain user actions, such as those that have little or no significance to the purpose of the system, to avoid using memory and computing resources to track actions that are insignificant.

Figure 5:
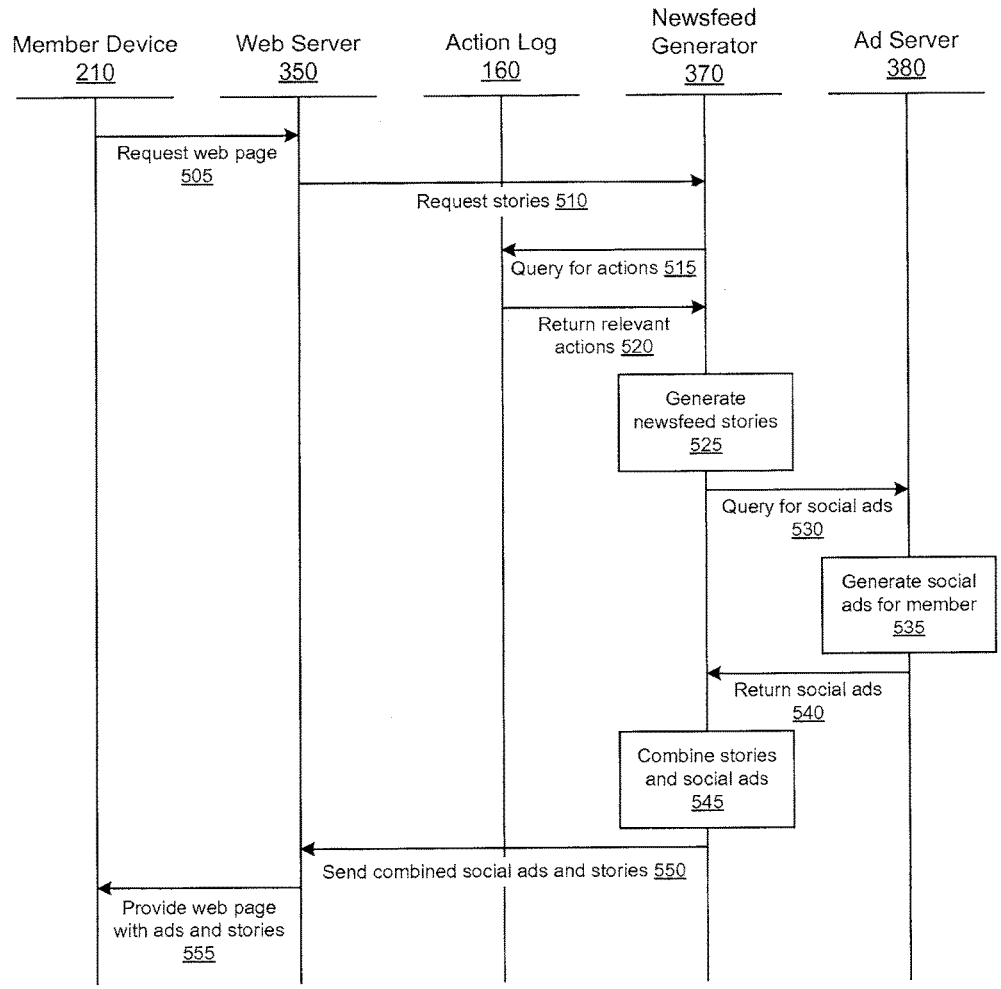
FIG. 5 is an interaction diagram of a process for generating an ad, in accordance with an embodiment of the invention.

FIG. 5 illustrates a process for generating social ads in accordance with one embodiment of the invention. In this embodiment, the process for generating social ads is used for a social network system 100 that also publishes information to its users about the actions of other users to whom the users are connected, in this case, friends. This information published to users about their friends outside the context of the social ads is provided in the form of short newsfeed stories (information messages) about the users' friends. The newsfeed stories are displayed to a user on a user's home page, for example. For each user, the website 100 is configured to generate a personalized set of newsfeed stories and social ads that are likely to be relevant to the user. Although described in the newsfeed context, in other embodiments the social ads may be generated by the website 100 and published to users in a website 100 that does not use newsfeed stories or publishes the social ads outside the context of newsfeed stories, such as in banner ads.

In a first step, a user requests 505 a web page from the social network system 100 via the user device 210. This may be an initial web page that is presented when a user logs into the website 100, or it may be any other page displayed by the website 100 in response to user selections. The web server 350 handles the request and, determining that the requested web page will require the display of one or more ads (such as a banner ad, text ad, and/or a social ad), the web server 350 begins the process of generating the social ad in the website 100. The web server 350 requests 510 stories from the newsfeed generator 370. As mentioned above, this request 510 may include a request for stories as well as social advertisements, as both of these items may be presented in the same interface as items that contain information about the actions that concern people or other objects on the website 100 in which the user has an interest. Social ads thus can be, at least in some cases, paid or sponsored stories. In other embodiments, the web server 350 may request a social ad and/or other ads for display on the requested web page, such as in a designated or reserved area of the web page.

In response to the request for stories, the newsfeed generator 370 queries 515 the action log 160 for information that may be relevant to the user, based on the user's action and profile properties, and the action log 160 returns 520 the requested set of actions to the newsfeed generator 370. The newsfeed generator 370 then generates 525 the newsfeed stories using this information. One embodiment of a process for requesting relevant information and generating the newsfeed stories is described in more detail in connection with FIG. 6.

In addition to generating 525 newsfeed stories, the newsfeed generator 370 may query 530 the ad server 380 for one or more social ads. The ad server 380 generates 535 the requested social ads according to a social ad generation algorithm 170 (see FIG. 1). One embodiment of a process for generating the social ad is described in more detail in connection with FIG. 9. Once the social ad is generated 535, the ad server 380 returns 540 the social ad to the newsfeed generator 370. The newsfeed generator 370 then combines 545 the newsfeed stories and the social ads into a single list and sends 550 them to the web server 350 for presentation to the user. The web server 350 then publishes the newsfeed stories and the social ads on the requested web page and provides 555 the web page to the user. The user is thus presented with relevant information about the user's friends' actions. This information may be paid for by an advertiser and may include additional information about that advertiser, its products, and/or its services. Still further, the web server 350 may also select one or more additional ads (such as banner or text ads) for inclusion on this web page. Described in more detail below, FIG. 8 is an example of a combination of newsfeed stories and social ads presented on a web page to a user.

Figures 6, 7, 8:
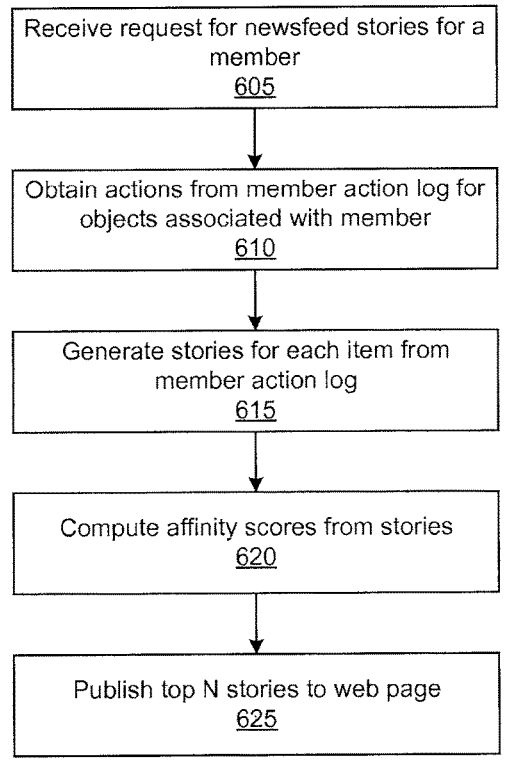
FIG. 6 is a flow chart of a process for generating newsfeed stories, in accordance with an embodiment of the invention.
FIG. 7 is a generic newsfeed story, in accordance with an embodiment of the invention.
FIG. 8 is a portion of a web page showing a combination of newsfeed stories and ads, in accordance with an embodiment of the invention.

FIG. 6 illustrates a process for generating newsfeed stories in connection with user actions on a social network system 100. This process may be performed by a newsfeed generator 370 in the website 100, as in the process illustrated in FIG. 5. The newsfeed generator 370 receives 605 a request for a set of newsfeed stories for a particular user. In response, the newsfeed generator 370 obtains 610 a listing of any actions contained in the action log 160 that are related to the user. In one embodiment, entries in the action log 160 are considered to be related to the user if they contain one of the user's friends or another object (such as an event or group) with which the user is connected. The objects with which a user is connected may be defined in the user's profile. Various other rules may be defined for determining whether particular entries in the action log 160 are relevant to a particular user, depending on the goal and purpose of the system.

Once the relevant actions are obtained, the newsfeed generator 370 generates 615 a newsfeed story for each action. The stories may contain varying amounts of information, depending on the type of action that is being reported. FIG. 7 illustrates a generic newsfeed story, which contains a user field 705, an action field 710, an optional target field 715, an optional object field 720, and an optional content field 725. An example newsfeed story that conforms to this story format is:

[User field 705] [Action field 710] [Target field 715] [Object field 720].

An example newsfeed story in this format is:

"John Smith invited Bob Roberts to John's 21st Birthday Party"

where the user target are link anchors to the respective users, and the object is a link anchor to an event. The example story above may further include graphics, links, or other content information for the Content field 725.

Because screen real estate is limited, and because for a given user there could be hundreds, potentially thousands, of stories that could displayed at any given time, the newsfeed generator 370 must generally select a subset of all the possible newsfeed stories for display to the user. Preferably, the newsfeed generator 370 selects the stories that would be most interesting to the particular user. It is noted that the newsfeed generator 370 performs this process for each user individually, so the selection of relevant information for one user need not, and generally should not, affect the selection of relevant information (such as newsfeed stories and social ads) that are displayed to any other user.

In one embodiment, the newsfeed generator 370 computes 620 an affinity score for each of a set of candidate stories. A user may have affinities for other users, types of actions, types of objects, and content. Accordingly, the affinity score may be based on a weighted function that takes into account the set of affinities for the particular user for each type of data field that is in a candidate story. The website may obtain a user's affinities based on the user's express interests (whether provided directly or indirectly, for example, through communications with other users) and/or impliedly based on the user's actions (e.g., a user's checking of another user's page indicates an interest in that other user, or clicking on particular types of links may indicate an interest in similar links). An affinity, as measured for example by an affinity score, need not be an actual subjective interest or lack of interest that a user has for something (i.e., the user likes punk rock music, and dislikes vegetarian restaurants), but rather it may merely be a correlation between something in the candidate story and some information stored in connection with that user, whether is an action taken by the user, a communication involving the user, a characteristic, feature or expressed interest in the user's profile.

Continuing the example from above, if a user has a high affinity score for John Smith or Bob Roberts and for being invited to events, the example story would tend to have a relatively high affinity score. Once the affinity scores are computed, the newsfeed generator 370 publishes 625 the top N newsfeed stories to the web page, where N is the number of stories allocated for the web page.

Figure 9:
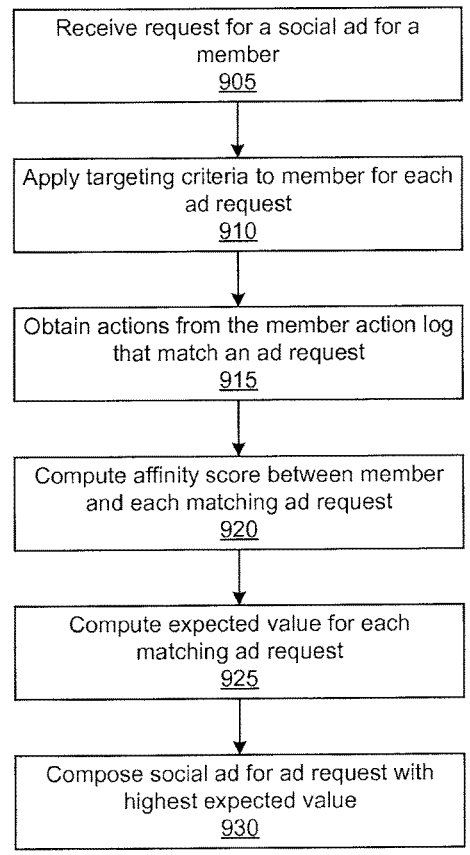
FIG. 9 is a flow chart of a process for generating newsfeed stories, in accordance with an embodiment of the invention.

FIG. 9 illustrates a process for generating social ads, which process may be performed by the ad server 380. The ad server receives 905 a request for a social ad for a particular user. In one embodiment, this request specifies the particular user by including the user's unique user identifier with the request. The ad server 380 then applies 910 the targeting criteria for each of the ad requests in the ad request database 175 to the user, if any. As described in more detail below in connection with FIG. 11, an ad request may specify a set of targeting criteria to direct the social ads to only those users who fit certain criteria. An example targeting criteria may specify any users between the ages of 18 and 30 and who have music in their interests. The ad server 380 would thus apply this targeting criteria to a particular user to determine whether to use or ignore this ad request for the user. This would then be repeated for each ad request, using the corresponding targeting criteria contained in each.

The ad server 380 then queries the action log 160 to obtain 915 action entries that match any of the ad requests whose targeting criteria were satisfied in step 910. As described in more detail below in connection with FIG. 11, an ad request may specify a type of object for which an action related to that object triggers a social ad. For example, to promote a concert for a new band, an ad request may specify an event object created for that concert. Accordingly, if one of the user's friends added the concert event to that friend's profile, the ad server 380 may obtain 915 that action from the log 160 to serve as a candidate for a social ad.

Each of the triggering actions that were obtained 915 from the log 160 for the qualifying ad requests represent a candidate social ad that may be generated by the ad server 380. To select which one or ones of the candidate social ads to generate, the ad server computes 925 an expected value for each of the candidate social ads. In one embodiment, the expected value is computed as a function of a per-click bid price for the ad weighted by an estimated probability that the social ad will be clicked by the potential recipient. To estimate the probability that a particular user will click on an ad, the ad server 380 computes this probability as a weighted function of the user's affinities for the objects in the action entry that triggered the candidate social ad and/or the user that took such action. In one embodiment, the affinity score between a user and a candidate social ad may be computed in the same way as the affinity score between a user and a newsfeed story is computed.

Once the expected values are computed for the candidate social ads, the ad server composes 930 a social ad for the candidate with the highest expected value. This social ad represents the social ad that will bring the most revenue value to the social network system 100 due to its combination of the probability that it will be selected and the bid amount that will be paid to the website 100 if it is selected. If more than one social ad is desired, the ad server 380 may compose 930 a social ad for the desired number of candidate ads having the highest expected values.

In an alternative process, the ad server 380 may create a number of social ads in a batch process and then store the social ads in a local storage. This way, a set of social ads are ready to be provided for each user without having to be created in real time. This helps with the scalability of the social network system 100, as real-time creation of social ads may be difficult for websites 100 with a large number of users and a resulting large number of requests for ads. Creating the social ads in a batch process also helps avoid spikes in the demand for resources. Since the creation of social ads may depend on information and preferences that change dynamically, the ad server 380 may periodically (e.g., every 15 minutes) dump the social ads and create a new batch.

FIG. 8 is a view of a portion of a web page for displaying newsfeed stories and social ads. In this example, a user is shown a list of information items about other people and/or things that the social network system 100 predicts will be interesting to the user. The first entry 810 and the fourth entry 840 are each a newsfeed story that communicates to the user that one or more of the user's friends joined a particular group on the social network system 100. The second entry 820 is another newsfeed story that communicates that another user posted a video to the website 100 and includes a link to watch that video.

Also contained within these newsfeed stories, in this example, is a social ad 830. This example social ad 830 communicates to the user that one of the user's friends associated their user profile with a business. (In this example, adding a link to another business profile, rather than to another user profile, is called becoming a "fan" of that business, rather than a "friend" of the other user.) This social ad 830 is an example of brand advertising, where an advertiser merely wishes to extend the recognition and value of the brand, instead of making a particular sale. In other embodiments, the social ad 830 may also contain content, such as a link to the advertiser's own website, and/or a call to action for the advertising.

One benefit of mixing the newsfeed stories and the social ads in a single list presented to a user is that there may be little or no differentiation between advertising and general information that a user would want to know. Users visit social network systems 100 to keep up to date on what their friends are doing, and the social ad can be as useful to the user as any other newsfeed story. Because the social ads and newsfeed stories may all be taken from the action log 160, it may be impossible for a user to determine whether an entry in the user's newsfeed is a newsfeed story or a social ad. In fact, the content of a social ad could actually show up as an organic, unpaid newsfeed story in other contexts. By paying for the social ad, the advertiser simply accelerates a newsfeed story so that it is published (or at least has a higher probability of being published) to the user's web page in a situation where it might not otherwise be selected for publication. In other embodiments, by paying for the ad the advertiser maximizes the chances the newsfeed story will be published to other users connected to the user that took the action. In some embodiments, the social ad may contain additional ad content appended to the story, so the social ads and the newsfeed stories may differ in their content.

Banner ads, text ads and other non-social ads can be selected for a given page request based on various attributes of the user and/or the requested page. For example, ad selection may be based on demographic information (age, sex, marital status, residence, and the like), as well as other information associated with a user profile, such as declared interests and the interests of the friends of a user.

Advertising Model

Figure 10:
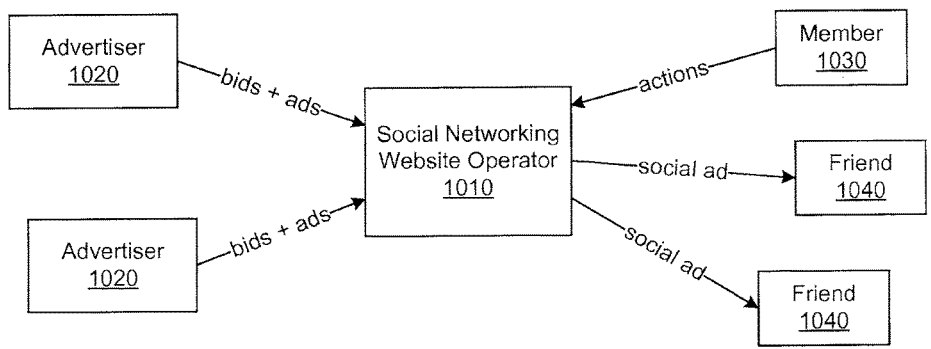
FIG. 10 is an event diagram of an advertising model, in accordance with an embodiment of the invention.

FIG. 10 illustrates an event diagram for an advertising model in accordance with one embodiment of the invention. In this advertising model, a number of advertisers 1020 bid for the placement of ads on a social network system 100. A social network system operator 1010 receives these bids, for example, through a web interface accessible to the advertisers 1020. Accompanying each bid is a description of the ad that the advertiser 1020 would like to publish to selected web pages on the social network system 100. The web interface may thus allow an advertiser 1020 to specify all of the relevant information for an ad request, including the bid amount for the ad. In one embodiment, the advertisers 1020 specify ad requests, such as the one shown in FIG. 11.

Figure 11:
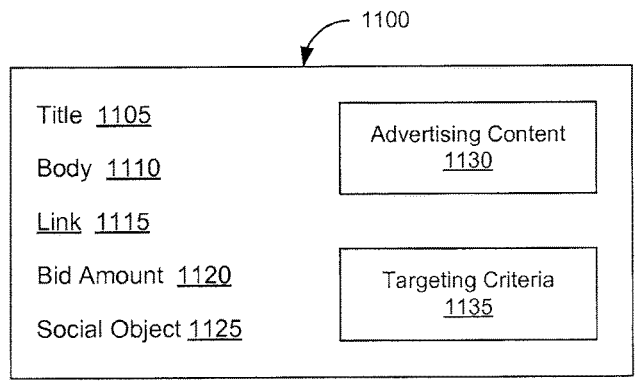
FIG. 11 is a diagram of an ad request, in accordance with an embodiment of the invention.

FIG. 11 is a diagram of some of the components of an ad request 1100, which an advertiser 1020 provides the social network system operator 1010. The ad request 1100 may be stored by the social network system 100 in the ad request database 175. In the example embodiment shown, the ad request 1100 comprises a title field 1105, a body field 1110, a link field 1115, a bid amount field 1120, and a social object field 1125. Non-social ads may have additional or alternative fields, such as fields or controls for uploading ad creative (e.g., image files, videos, and/or text).

The title field 1105 and body field 1110 may be used by the website to publish the social ad in a story format. For example, the social ad may include the title field 1105 as the header and then a textual story in a format as shown in FIG. 7. For example, the body field 1110 may specify: "[User-.Name] has purchased tickets for [Event.Name]." The resulting social ad would contain this text, with the names of the User and Event objects associated with the action that the social ad is describing inserted into the text as indicated. The link field 1115 may also be added to the content of the social ad, for example, for providing the call to action of the ad. Lastly, the ad request 1100 may contain additional advertising content 1130 to be appended to the social ad. This content 1130 may include any type of media content suitable for presentation on a web page, including pictures, video, audio, hyperlinks, and any other suitable content.

The bid amount field 1120 specified in the ad request 110 may indicate an amount of money that the advertiser 1020 will pay for each time a user presented with the social ad clicks on it. Alternatively, the bid amount field 1120 may specify an amount that the advertiser 1020 will pay the website operator 1010 each time the social ad is displayed to a user or a certain number of users. The social object field 1125 specifies an object (or multiple objects) for which an action related to the object will trigger the social ad. This is described above in connection with step 915 of the process for generating a social ad, shown in FIG. 9. In addition, the ad request 1100 may allow the advertiser 1020 to specify targeting criteria 1135, the use of which is described above in connection with step 910 of the process for generating a social ad. This targeting criteria may be a filter to apply to fields of a user's user profile or other object, and/or it may include free form text.

Turning again to the event diagram of FIG. 10, the social network system operator 1010 receives ad requests from a number of advertisers 1020. The social network system operator 1010, via the website 100, receives a number of actions taken by a user 1030. As discussed above, these actions may be on the website 100 or on a third-party website 140, or real-world actions recorded and communicated to the social network system operator 1010. These actions are potential triggers for one or more social ads delivered to the user's friends 1040. For example, if the user takes an action that is identified in an ad request 1100 of one of the advertisers 1020, the social network system operator 1010 may generate a social ad based on that action and publish that social ad to a web page provided to one or more of the friends 1040. It is noted that the diagram of FIG. 10 is from the perspective of the user 1030, and the user's friends 1040 are also users of the website 100. Accordingly, actions taken by them may result in social ads delivered to their friends (which includes the user 1030). In addition, a user's actions, either alone or combined with other user's actions, may result in social ads delivered to users who have some other relationship to that user, such as other users who belong to same network or group as the user.

Social Ads Based on Actions on Third-Party Websites

Figure 12:
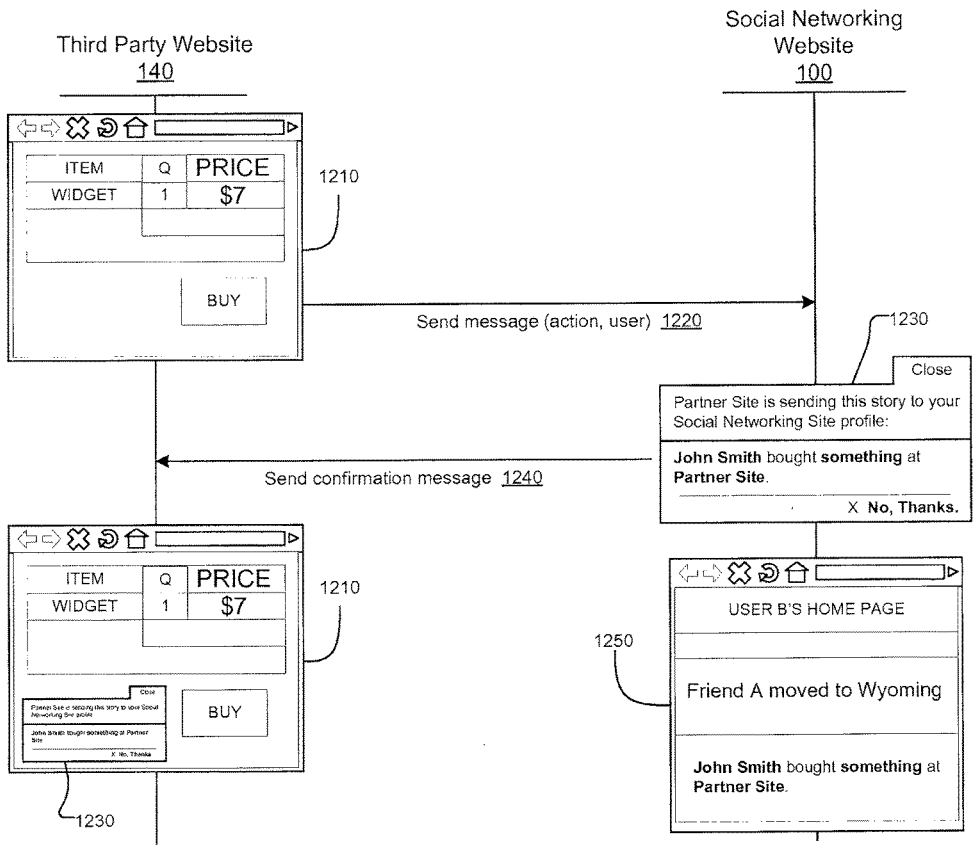
FIG. 12 illustrates a process in which actions from a third party website are communicated to and used by a social network system to generate ads, in accordance with an embodiment of the invention.

FIG. 12 illustrates a process in which actions from third party websites 140 are communicated to and used by a social network system 100 to generate ads, as described above. In the example shown, a user makes a purchase on a third party website 140 hosted on a different domain than the social network system 100. The fact of this purchase is then communicated to the social network system 100, which uses the information to publish "social" or more conventional ads to one or more friends of the user. As described above, this communication from third-party website 140 to social network system 100 may include multiple communications; More particularly, a conversion (e.g., confirmation or thank you) page may be transmitted to the user's client device as a result of making the purchase. A JavaScript call or tracking pixel included in the conversion page then ultimately communicates the action and associated identifying parameters to social network system 100. Although described in the context of a purchase on the third party website 140, the technique is not limited to purchases. Any other user actions on a third party website 140 may be communicated to the social network system 100 for use thereby, including registering for an account, viewing an item, saving an item to an account, renting an item, making a reservation, participating in an activity, or service, downloading or uploading content, interacting with content, subscribing to an information resource, or any other action which the operator of the third party website decides to select for such tracking. More specific examples of other types of actions in other domains that may be useful for generating ads on the social network system 100 include purchasing an article of clothing, subscribing to a blog, storing an item in a wish list, purchasing tickets to a concert, registering for a marathon, making a flight or restaurant reservation, and donating to a charity.

In the example of FIG. 12, a user operates a client application, such as a web browser, to view a web page at the online store hosted by a third party website 140. The user decides to purchase an item, for example a widget. The user will typically be presented with a purchase page 1210 on which the user can confirm the purchase, for example by clicking on a "Buy" button. The third party website 140 generates a message that identifies the third party website 140 and describes the type of action (e.g., indicating whether the action is a purchase, a rating, a request for information, a subscription, or the like, as well as any other information needed to describe the action, such as the item that was purchased). In this example, the message would identify the action as a purchase and would describe the item that was purchased. The third party website 140 then transmits 1220 this message to the social network system 100 directly or indirectly by way of tracking pixels or JavaScript code snippets that are first sent with the confirmation page, and which then themselves transmit the message to social network system 100.

In one embodiment, the third party website 140 and/or the social network system 100 determine whether the user is a user of the social network system 100. For example, the third party website 140 may access a cookie on the user's computer, where the cookie is associated with the social network system 100. Since the social network system 100 and the third party website 140 are on different domains, the user's browser program may include security features that normally prevent a website from one domain from accessing content on other domains. To avoid this, the third party website 140 may use nested iframes, where the third party website 140 serves a web page that includes a nested iframe in the social network website's domain, thereby allowing the nested iframe to access the user information and send the information back to the third party website 140. Repeated nesting of iframes further allows the social networking site 100 to communicate information back to the third party website 140. By using this technique, the third party website 140 and the social network system 100 can communicate about the user without sharing any of the user's personal information and without requiring the user to log into the social network system 100.

After the social network system 100 receives the message communicating the action information from the third party website 140, it generates a confirmation message 1230 to be displayed to the user on the third party website 140. For example, the confirmation message may provide a sample of the story that could be published to the user's friends based on the user's actions on the third party website 140. In this example, the message is: "John Smith bought <something> at <Partner Site>" (where the user would be "John Smith, "<something> would be replaced by the name of item purchased, and <Partner Site> would be replaced by the name and a link to the third party website 140). The confirmation message 1230 is passed 1240 back to the third party website, where it is displayed in the web page 1210 on the domain of the third party website 140.

On this web page 1210, this confirmation message 1230 informs the user of the story that the user's friends may be provided via the social network system 100. The confirmation message 1230 may also allow the user to opt out of the feature to prevent the message from being shown to others. In other embodiments, the user can opt-in or opt-out of allowing to be published stories, or particular types of stories, generated from actions taken by particular third party websites (or groups of third party websites) in advance of the user taking such actions.

At some later point in time, the social network system 100 may communicate the story about the user's purchase to other users who have a connection to the user on the social network system 100. This communication may be in the form of a series of stories published on another user's home page 1250 on the social network system 100, in accordance with the embodiments described above.

In this way, the social network system 100 can communicate a user's actions on other third party websites 140 to the user's friends on the social network system 230. Beneficially, communicating a user action on a third party website 140 to the user's connections on a social network system 100 may motivate these other users to perform a similar action. For example, notifying a user's friends that a user has purchased a specific movie may prompt the friends to purchase the movie as well, or at least generate some interest in that movie. Moreover, this technique may be used in combination with the advertising model and ad requests described above, or it may be performed by the social network system independently of any advertising model. Still further, the conversation itself, as discussed below, can be tracked and correlated to advertising impressions associated with ads displayed to the user on social network system 100.

Social Ads and Messages Presented on a Third Party Website

As described above, actions by users performed off of a social network system (e.g., actions on third party websites or in the real world) may be used to generate ads on the social network system. Conversely, in various embodiments of the invention, a social network system can collect its users' actions and then present ads and/or other information concerning actions taken by its users on third party websites. In this way, the techniques for promoting actions using this information can be extended beyond a social network system itself.

Embodiments of the invention may use any of the mechanisms described above for collecting user actions and generating ads therefrom. For example, a social network system may log a number of actions about a user's connections on a particular third party website, such as the purchase of a particular item. When the user visits the third party website and views a web page associated with that item, the third party website may communicate with the social network system to determine that the user's connections have also purchased this item. Mechanisms for communicating information about a user between a third party website and a social network system are described above.

Once the third party website receives this information, it can present the information to the user. For example, when viewing the page for a movie that is on sale via the third party website, the third party website may present a message to the user that a certain number of the user's connections from the social network system have rated the movie positively. For example, the message might read: "Ten of your friends have liked this movie." The user is thus encouraged to purchase the movie on the third party website because the user's friends from the social network system like the movie.

Accordingly, ads or other information concerning actions taken by a user's friends may be presented to users off the social network system, just as on the website as described above. Used in this way, the information can help encourage a user to take an action (such as a purchase) at the point the user is deciding to act. The information need not be in response to an advertising effort in which one of the websites is being compensated, as this exposure may have a synergistic effect for both the social network system and the third party website.

This technique can be used in a variety of other contexts. For example, the technique can be used to communicate a user's interest in particular items or content on third party websites. The user can be provided with information by the third party website that is related to content offered by the third party website, but where that information is gathered by the social network system. The third party websites may thus leverage the information gathered by the social network system, including the inherent value of the information being about third parties to whom the user has some connection.

The user's experience can be integrated between the third party website and the social network system such that the information is used in both domains. For example, a user's movie preferences can be access by the user's friends on a social network system, while the user can also view the user's friends' movie ratings on a third party website where the user buys or rents movies. In addition, third party websites may provide content from the social network system, such as newsfeeds or series of stories about a user's friends that the user would normally be presented with on the social network system. These are just a few examples of applications for the cross-domain use of socially relevant information, some but not all of which involve advertising.

In one embodiment, the user interface on the third party website provides a bidirectional interface in which user interface elements from the social network system domain and the third party website domain affect the presentation of user interface elements of the other. For example, if content from a social network system is presented in a frame (e.g., an iframe) on a web page of the third party website, actions that a user takes on the frame may affect how information in the web page is presented. These actions may be as simple as a resizing event of the frame, or more complicated such as a mouse-over of an item in the social networking frame causing a corresponding item in the third party domain part of the web page being enhanced.

In one particular example, a frame from a social network system may present a list of a user's friends. If the user clicks on a particular friend, the social network system may communicate to the third party website a list of items that the friend has purchased (without disclosing to the website any information, including the identity, of those friends). The third party website may then highlight these items on its own web page, thereby providing the user with an easy interface for locating items on the website to purchase based on the user's friends' purchase histories.

Alternative Applications

Embodiments of the invention have been described in the context of social network systems. However, the techniques described herein may be applied to a number of other types of websites that are not necessarily concerned with social networking. Such websites include any website that tracks any kind of information about users of the website and then provides that information to other users. For example, a retail website may keep track of users who make purchases from the website, then communicating the information about some of its users to other users using the techniques described herein.

In this sense, the connections between users of a website need not be formal or express connections, as is common in the social networking context. Instead, the connections may be implied or otherwise assumed due to common characteristics, traits, or user actions. For example, if the website keeps track of personal information about its users, it may communicate information to a particular user about the actions of other users with something in common. For example, a website might tell a user who was graduated from a University: "There are 26 other graduates from University who have bought this book on this website." In another example, a web blog dedicated to electronic gadgets may tell a person who comments on a particular topic in the blog: "Four people who have commented on this topic own the product. Click on the link below to purchase it, too."

In another context, the techniques described herein may be used with search engines. For example, users who search for a particular item on a search engine are more likely to be interested in items that their friends or other connections have bought. If the search engine keeps track of users' connections, the search engine can inform a user of the user's connections' actions in addition to providing the user with search results. If the search engine keeps other information concerning a user, such as biographic, demographic, and other types of descriptive information, including interests, the search engine can inform the user of actions taken by third parties who have provided some of the same or similar information. The search engine may also change the order of the search results presented to the user based on the user's connections' actions, or actions of third parties who have provided the same or similar information.

In another embodiment, the ads and other informational messages described herein may be presented outside of the social network system. For example, information about actions taken by users of the social network may be received and logged by the social network system, and ads and/or other informational messages may be generated based on these actions. These informational message can be communicated from the social network system to another domain, such as a different website, and presented to one or more users of the social network. As described herein, messages about a particular user would be presented to others users with whom the user has a connection in the social network. In this way, the benefits of the ads and other informational messages described herein can be achieved even outside the social network system.

Conversion Tracking Information

In particular implementations, the social network system 100 generates conversion data from social and other ads to provide advertisers with insights as to the performance of the ads the place on the system. In one implementation, social network system 100 tracks the impressions for advertisements provided to users that later may be correlated to conversions, as described herein. In some implementations, tracking a conversion can involve weaving isolated events into a story of cause and effect. The data structures outlined below contain the info used to construct a story of user, ad impression, optional click and conversion. When the information is joined together, the social networking system can report meaningful statements like "10 users bought an Obama t-shirt on threadless.com after seeing 55 impressions from the ad 'Unicorn t-shirt' between 15 Aug. and 22 Aug. 2011." Furthermore, the reports can distinguish between social ads and other advertisement types to allow advertisers to compare their relative effectiveness.

In one implementation, conversion tracking involves the following database tables:

| pixel table |
|---|
| pixel_id |
| run_status |
| name |

| pixel table |
|---|
| time_created |
| time_updated |
| account_id |

| impression.php params |
|---|
| id |
| h |
| type |
| sku |
| value |
| debug |

| unattributed conversion log |
|---|
| user_id |
| client_ip |
| client_flags |
| server_ip |
| user_agent |
| event_machine_cookie |
| event_referer_string |
| conversion_time |
| conversion_tracking_id |
| conversion_advertiser_event_type |
| conversion_advertiser_string |
| conversion_advertiser_value |
| conversion_logged_in |

| ad_imps |
|---|
| bucket_hint |
| ad_id |
| db_id |
| user_id |
| imp_location |
| imp_page |
| imp_time |
| client_ip |
| client_flags |
| imp_bid_type |
| imp_bid |
| imp_price |
| imp_social_score |
| imp_ectr |
| imp_qrt_experiment |
| imp_qrt_version |
| imp_page_type |
| imp_cluster_id |
| imp_social_action |
| imp_position |
| imp_num_positions |
| server_ip |
| imp_load_type |
| imp_discount |
| imp_page_tab |
| imp_adnetwork_id |
| imp_region_id |
| imp_social_items |
| imp_usd_bid |
| imp_usd_price |
| imp_country |
| imp_queue_slot |

```
dim_admarket_campaign_map
─────────────────────────────
    account_id
    campaign_id
    campaign_name
    campaign_status
    campaign_start
    campaign_end
    adgroup_id
    adgroup_name
    ad_id
    obj_id
    ad_status
    ad_start
    ad_end
    location
    account_name
    account_type
    ds
```

```
attributed conversions hive table
─────────────────────────────────
    conversion_ts
    account_id
    tracking_id
    user_id
    adid (multiple adids per conversion possible)
    impression_count
    impression_most_recent_ts
    time_diff
    conversion_logged_in
    conversion_advertiser_value
    conversion_advertiser_string
    conversion_advertiser_event_type
```

```
pixel-user association table
────────────────────────────
    pixel_id
    user_id
    time
    data
```

Figure 13:
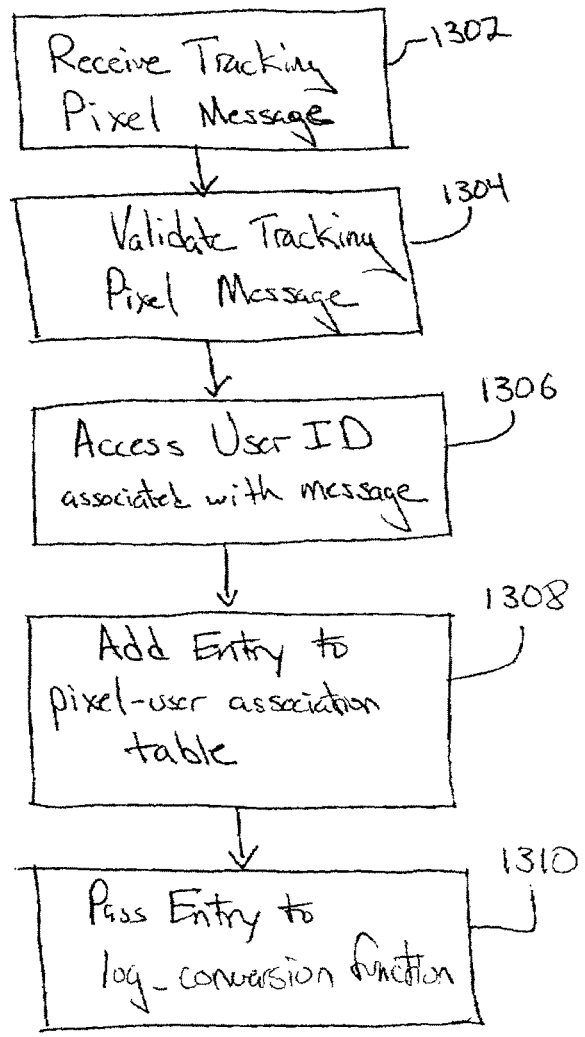
FIG. 13 is a flow chart of a process for creating pixel-user association entries.

FIG. 13 illustrates an example method for processing a message generated by activation of a tracking pixel. As described herein, when a browser or other client application processes a web page with a tracking pixel, it transmits a request to the social network system 100. When the social network system 100 receives the tracking pixel message (1302), it validates the tracking pixel message (1304) by, for example, validating the tracking identifier of the message using the hash value. The social network system 100 then accesses a user identifier of the user associated with the tracking pixel message (1306). In one implementation, the tracking pixel message may include a browser cookie that includes information that resolves to a user identifier or a user identifier account. In one implementation, the social network system 100 also determines whether the user is currently logged in to the social networking website and records this information in connection with the association. The social network system 100 then adds an entry to the pixel-user association table (see above) (1308) and passes the entry to a log_conversion function to add the entry to an unattributed conversion log for possible attribution in a batch data processing step (1310).

Figure 14:
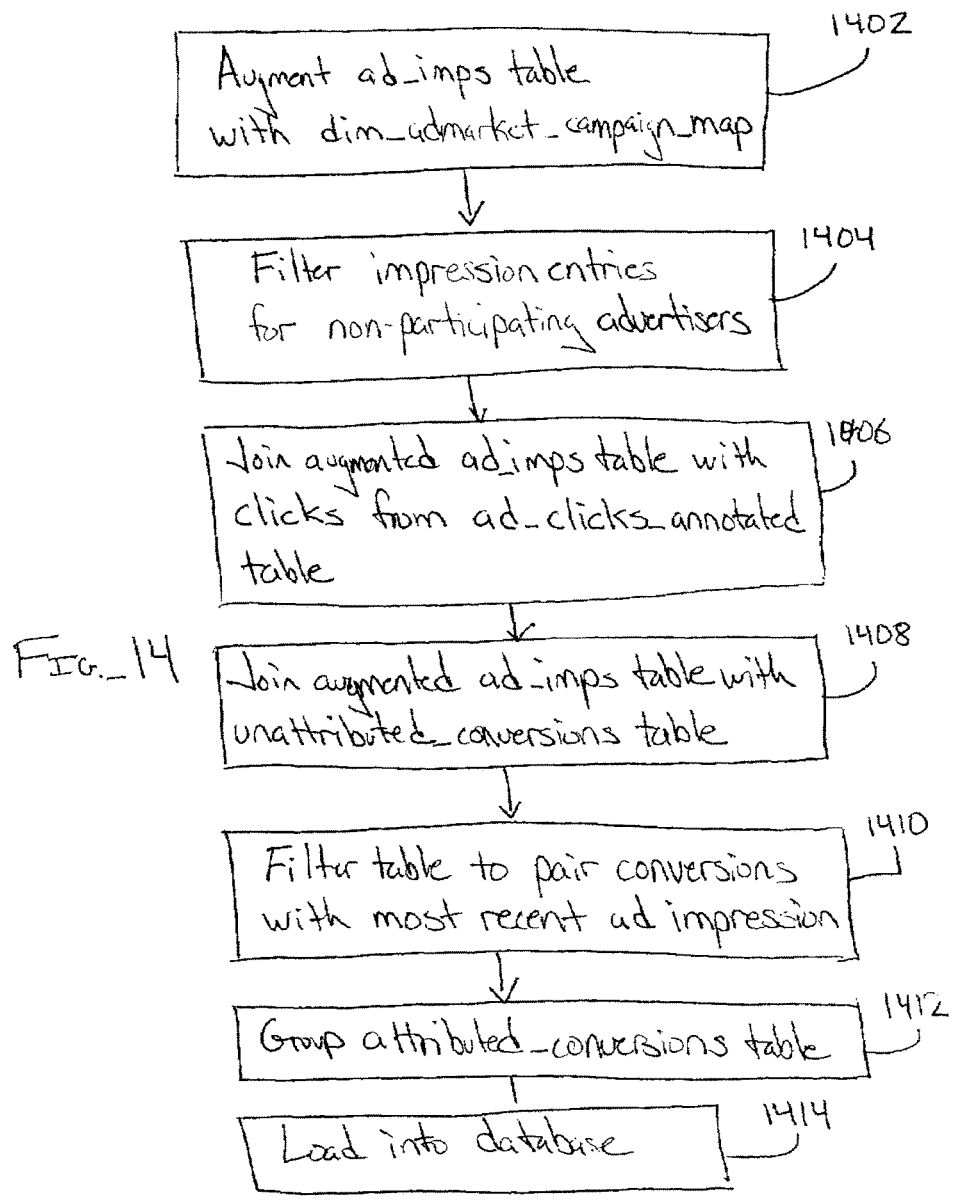
FIG. 14 is a flow chart of a process for generating conversion tracking data.

FIG. 14 illustrates an example method implemented by a log_conversion function that operates in a batch process to attribute ad impressions and/or ad clicks to conversions recorded in the pixel-user association table. In one implementation, the log_conversion function augments the ad_imps table with the dim dim_admarket_campaign_map (1402) and filters out the entries corresponding to ad impressions related to advertisers that do not track conversions (1404). The log_conversion function then joins the augmented ad_imps table with clicks from ad_clicks_annotated table (1406) and further joins the resulting table with the augmented ad_imps table with unattributed_conversions on account ID and user ID (1408). The log_conversion function then filters the joined table into table of conversions paired with most recent ad_imps entry (1410), groups attributed conversions by tracking ID, then successively by adgroup, campaign and account ID (1412), and loads the resulting tables into an analytics databases (1414) from which conversion tracking reports for advertisers can be generated.

From the data stored in the analytics database, social network system 100 may provide reports that include the following metrics:

Post Impression Conversion: any conversion that occurred after a user saw an ad (includes post-click conversions);

Post Click Conversion: any conversion that occurred after a user clicked an ad;

Post XXX Conversion (n day): the total conversions that occurred within a specified time frame from the event. For example. the Post Impression Conversion (7 day) column represents the conversions that occurred within 7 days of the impression event. Additional reporting filters can include break downs between social ads and other ad types (such as banner, text, search and other ads). For example, in one implementation, reports can be in a table format including the following table columns or fields: delivery date, conversion event name, SKU, campaign identifier, ad identifier, number of impressions, number of clicks, click-thru rate, number of conversions, click-to-conversion rate, and impression-to-conversion rate.

In addition, a tracking report can be created that presents conversion metrics from the point of view of the named tracking pixels, like "sign-up". This will allow an advertiser to see how each ad or campaign has performed on specific events in the advertiser's sales funnel. The report may also show more detailed metrics about conversions. In one implementation, the report may include the following fields: date, conversion event name, SKU, number of conversions, conversion value (average), conversion rate, number of conversions 28 days from impression, number of conversions 7 days from impression, and number of conversions 1 day from impression.

Example Computing System Architecture

Figure 15:
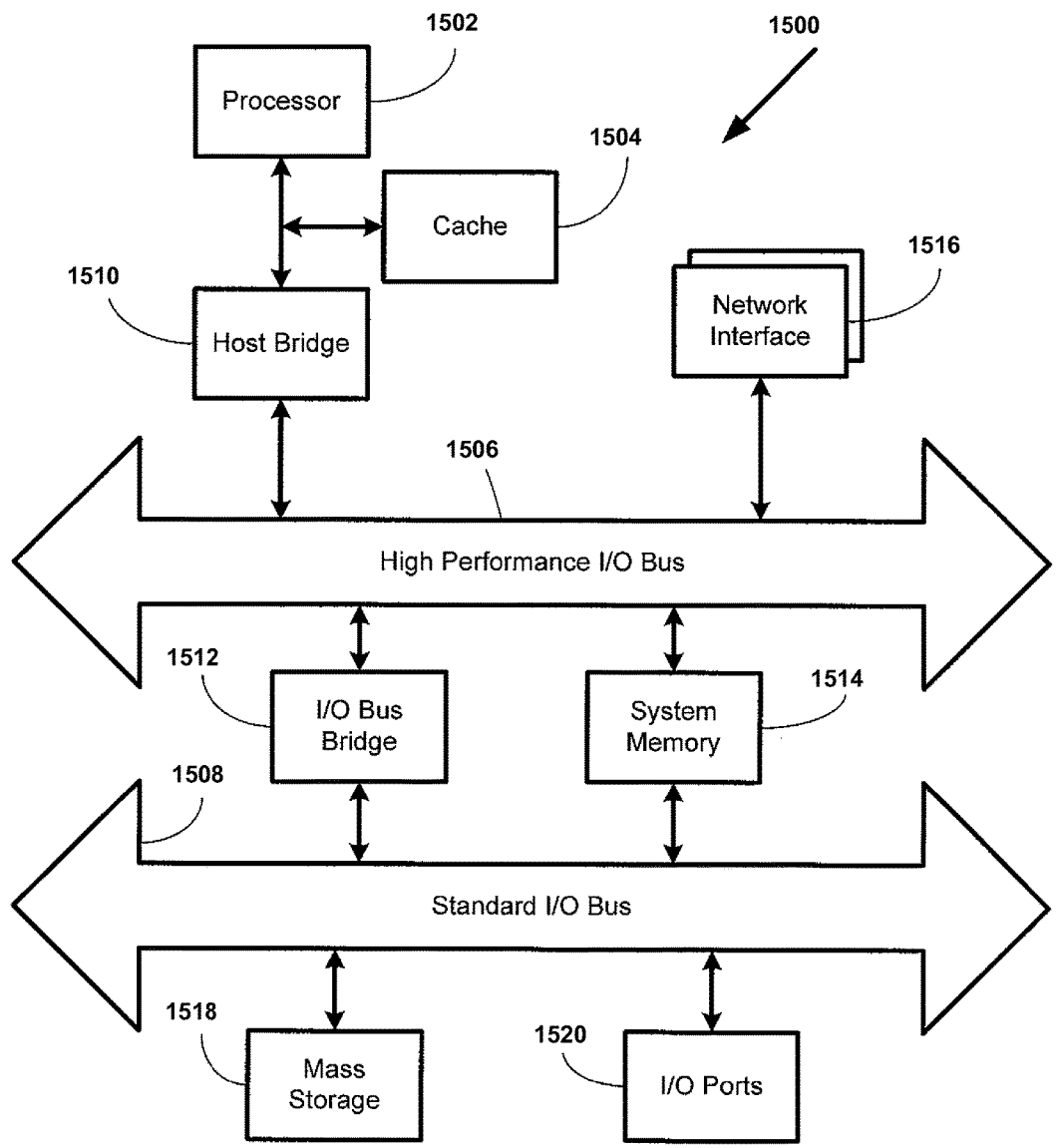
FIG. 15 illustrates an example computer system architecture.

FIG. 15 illustrates an example computing system architecture, which may be used to implement one of the computing systems described above, such as web servers, and the like. In one embodiment, hardware system 1500 comprises a processor 1502, a cache memory 1504, and one or more executable modules and drivers, stored on a tangible computer readable medium, directed to the functions described herein. Additionally, hardware system 1500 includes a high performance input/output (I/O) bus 1506 and a standard I/O bus 1508. A host bridge 1510 couples processor 1502 to high performance I/O bus 1506, whereas I/O bus bridge 1512 couples the two buses 1506 and 1508 to each other. A system memory 1514 and one or more network/communication interfaces 1516 couple to bus 1506. Hardware system 1500 may further include video memory (not shown) and a display device coupled to the video memory. Mass storage 1518, and I/O ports 1520 couple to bus 1508. Hardware system 1500 may optionally include a keyboard and pointing device, and a display device (not shown) coupled to bus 1508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1500 are described in greater detail below. In particular, network interface 1516 provides communication between hardware system 1500 and any of a wide range of networks, such as an Ethernet (e.g., IEEE 802.3) network, a backplane, etc. Mass storage 1518 provides permanent storage for the data and programming instructions to perform the above-described functions implemented in the servers of social networking system and third party websites, whereas system memory 1514 (e.g., DRAM) provides temporary storage for the data and programming instructions when executed by processor 1502. I/O ports 620 are one or more serial and/or parallel communication ports that provide communication between additional peripheral devices, which may be coupled to hardware system 1500.

Hardware system 1500 may include a variety of system architectures; and various components of hardware system 1500 may be rearranged. For example, cache 1504 may be on-chip with processor 1502. Alternatively, cache 1504 and processor 1502 may be packed together as a "processor module," with processor 1502 being referred to as the "processor core." Furthermore, certain embodiments of the present invention may not require nor include all of the above components. For example, the peripheral devices shown coupled to standard I/O bus 1508 may couple to high performance I/O bus 1506. In addition, in some embodiments, only a single bus may exist, with the components of hardware system 1500 being coupled to the single bus. Furthermore, hardware system 1500 may include additional components, such as additional processors, storage devices, or memories.

In one implementation, the operations of the embodiments described herein are implemented as a series of executable modules run by hardware system 1500, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 1502. Initially, the series of instructions may be stored on a storage device, such as mass storage 1518. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 1516. The instructions are copied from the storage device, such as mass storage 1518, into memory 1514 and then accessed and executed by processor 1502.

An operating system manages and controls the operation of hardware system 1500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications and models data as a graph of associations. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network website, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, by one or more processors associated with one or more computing devices of a social networking system:

maintaining, by one or more of the processors, a profile for each of one or more users of the social networking system, wherein the profile for each user comprises information about the user and information identifying connections to one or more other users of the social networking system;

tracking, by one or more of the processors, actions taken by one or more of the users of the social networking system on third-party websites by:

receiving one or more tracking pixel messages generated by a browser client associated with one or more of the users of the social networking system, respectively, the browser client having accessed a tracking pixel associated with a third-party website having a different domain than the social networking system, each tracking pixel message comprising information about an action taken by one or more of the users of the social networking system on the third-party website, wherein each tracking pixel message points to an endpoint at the social networking system, and wherein each tracking pixel message is generated based on a tracking identifier, a hash of the tracking identifier, a category of the action, and a value associated with the category of the action;

validating each tracking pixel message by validating the tracking identifier of the tracking pixel message using the hash value;

identifying a user of the social networking system associated with the tracking pixel message by accessing a user identifier associated with the tracking pixel message, the user identifier corresponding to the user; and recording, for each validated tracking pixel message, the action taken by the user on the third-party website in a pixel-user association table;

correlating, by one or more of the processors, each of the actions on the third-party website recorded in the pixel-user association table with one or more social advertisements presented to one or more of the users of the social networking system, wherein each social advertisement presented to a particular user of the social networking system comprises information identifying an action taken by one or more other users of the social networking system on the third-party website, wherein each of the one or more other users are connected within the social networking system as friends to the particular user to whom the social advertisement is presented; and generating a tracking report for display to an advertiser associated with the one or more social advertisements, the tracking report comprising statistical data that associates one or more user profile attributes to one or more of the social advertisements and actions on the third-party website that correlate to respective ones of the social advertisements.

2. The method of claim 1, wherein the statistical data comprises a conversion rate for at least one social advertisement presented to one or more users on the social networking system based on a number of impressions for the at least one social advertisement and a number of logged actions that have been correlated to the at least one social advertisement.

3. The method of claim 2, wherein the statistical data further comprises a click thru rate for the at least one social advertisement presented to one or more users on the social networking system based on the number of impressions for the at least one social advertisement and a number of logged clicks that have been correlated to the at least one social advertisement.

4. The method of claim 1, wherein the statistical data comprises, for at least one social advertisement presented to one or more users on the social networking system, a number of conversions that have been correlated to an ad impression, wherein the conversion occurred within a specified period of time from the correlated ad impression.

5. The method of claim 1, wherein the social advertisements are generated from data recorded from activities of one or more users by the social networking system.

6. The method of claim 5, further comprising
receiving a plurality of advertisement requests to advertise on the social networking system, each advertisement request identifying a type of action on which to base a social advertisement; and
for one of the users of the social networking website:
matching an advertising request to a logged action, wherein the logged action matches the type of action identified in the advertising request, and wherein the logged action is associated with another user of the social networking system with whom the user has a connection,
generating a social advertisement directed to the user, wherein the social advertisement comprises an informational message that communicates the matching logged action, and
providing content to the user, the content comprising the social advertisement.

7. The method of claim 5 wherein the activities of the one or more users are actions taken by the one or more users on the third-party website.

8. The method of claim 1, wherein each profile further includes information specifying whether the user associated with the profile has opted-in or opted-out of allowing social advertisements to reference the user's actions on the third-party website.

9. The method of claim 1, wherein the social advertisements are presented to users of the social networking system on a webpage of the social networking system.

10. The method of claim 1, wherein the social advertisements are presented to users of the social networking system on a webpage of the third-party website.

11. The method of claim 1, wherein the social advertisements are presented to users of the social networking system on a webpage of another third-party website.

12. The method of claim 1, further comprising logging, by one or more of the processors, the actions taken on the third-party website, each logged action including information about the action.

13. The method of claim 1, wherein each tracking pixel message further comprises a product identifier or service identifier associated with the action.

14. The method of claim 1, wherein each tracking pixel message further comprises information identifying a product or service purchased by one or more of the users.

15. The method of claim 1, wherein the statistical data comprises post-impression conversion data for each social advertisement.

16. The method of claim 1, further comprising generating a report comprising a comparison of conversion data for one or more social advertisements and one or more other advertisement types that are presented to the one or more of the users of the social networking system.

17. The method of claim 1, wherein the action taken by the user on the third-party website comprises making a purchase on the third-party website.

18. The method of claim 1, wherein the action taken by the user on the third-party website comprises downloading content from the third-party website.

19. A social networking system comprising: one or more processors; a memory comprising instructions executable by the one or more processors; and the one or more processors coupled to the memory and operable to execute the instructions, the one or more processors being operable when executing the instructions to:
maintain a profile for each of one or more users of the social networking system, wherein the profile for each user comprises information about the user and information identifying connections to one or more other users of the social networking system;
track actions taken by one or more of the users of the social networking system on third-party websites by:
receiving one or more tracking pixel messages generated by a browser client associated with one or more of the users of the social networking system, respectively, the browser client having accessed a tracking pixel associated with a third-party website having a different domain than the social networking system, each tracking pixel message comprising information about an action taken by one or more of the users of the social networking system on the third-party website, wherein each tracking pixel message points to an endpoint at the social networking system, and wherein each tracking pixel message is generated based on a tracking identifier, a hash of the tracking identifier, a category of the action, and a value associated with the category of the action;
validating each tracking pixel message by validating the tracking identifier of the tracking pixel message using the hash value;
identifying a user of the social networking system associated with the tracking pixel message by accessing a user identifier associated with the tracking pixel message, the user identifier corresponding to the user; and
recording, for each validated tracking pixel message, the action taken by the user on the third-party website in a pixel-user association table;
correlate each of the actions on the third-party website recorded in the pixel-user association table with one or more social advertisements presented to one or more of the users of the social networking system, wherein each social advertisement presented to a particular user of the social networking system comprises information identifying an action taken by one or more other users of the social networking system on the third-party website, wherein each of the one or more other users are connected within the social networking system as friends to the particular user to whom the social advertisement is presented; and
generate a tracking report for display to an advertiser associated with the one or more social advertisements, the tracking report comprising statistical data that associates one or more user profile attributes to one or more of the social advertisements and actions on the third-party website that correlate to respective ones of the social advertisements.

20. One or more non-transitory computer-readable media comprising instructions operable to cause one or more processors associated with one or more computing devices of a social networking system to:
maintain a profile for each of one or more users of the social networking system, wherein the profile for each user comprises information about the user and information identifying connections to one or more other users of the social networking system;
track actions taken by one or more of the users of the social networking system on third-party websites by:

receiving one or more tracking pixel messages generated by a browser client associated with one or more of the users of the social networking system, respectively, the browser client having accessed a tracking pixel associated with a third-party website having a different domain than the social networking system, each tracking pixel message comprising information about an action taken by one or more of the users of the social networking system on the third-party website, wherein each tracking pixel message points to an endpoint at the social networking system, and wherein each tracking pixel message is generated based on a tracking identifier, a hash of the tracking identifier, a category of the action, and a value associated with the category of the action;

validating each tracking pixel message by validating the tracking identifier of the tracking pixel message using the hash value;

identifying a user of the social networking system associated with the tracking pixel message by accessing a user identifier associated with the tracking pixel message, the user identifier corresponding to the user; and recording, for each validated tracking pixel message, the action taken by the user on the third-party website in a pixel-user association table;

correlate each of the actions on the third-party website recorded in the pixel-user association table with one or more social advertisements presented to one or more of the users of the social networking system, wherein each social advertisement presented to a particular user of the social networking system comprises information identifying an action taken by one or more other users of the social networking system on the third-party website, wherein each of the one or more other users are connected within the social networking system as friends to the particular user to whom the social advertisement is presented; and generate a tracking report for display to an advertiser associated with the one or more social advertisements, the tracking report comprising statistical data that associates one or more user profile attributes to one or more of the social advertisements and actions on the third-party website that correlate to respective ones of the social advertisements.

* * * * *